(12) United States Patent
Chu

(10) Patent No.: US 7,068,497 B2
(45) Date of Patent: Jun. 27, 2006

(54) FLAT PANEL DISPLAY

(75) Inventor: Yao-Wen Chu, Taoyuan (TW)

(73) Assignee: Benq Corporation, Taoyuan Shien (TW)

( * ) Notice: Subject to any disclaimer, the term of this patent is extended or adjusted under 35 U.S.C. 154(b) by 0 days.

(21) Appl. No.: 10/912,215

(22) Filed: Aug. 6, 2004

(65) Prior Publication Data
US 2005/0051693 A1 Mar. 10, 2005

(30) Foreign Application Priority Data
Aug. 7, 2003 (TW) ............................... 92121728 U

(51) Int. Cl.
*G06F 1/16* (2006.01)

(52) U.S. Cl. ...................... 361/681; 248/919; 248/920

(58) Field of Classification Search ................ 248/919, 248/920; 361/681
See application file for complete search history.

(56) References Cited

U.S. PATENT DOCUMENTS

| | | | |
|---|---|---|---|
| 4,669,694 A * | 6/1987 | Malick ....................... 248/397 |
| 6,288,891 B1 * | 9/2001 | Hasegawa et al. .......... 361/681 |
| 6,819,550 B1 * | 11/2004 | Jobs et al. .................. 361/683 |
| 2004/0035989 A1 * | 2/2004 | Sweere et al. .............. 248/127 |
| 2004/0262474 A1 * | 12/2004 | Boks et al. ............... 248/276.1 |

* cited by examiner

*Primary Examiner*—Lynn Feild
*Assistant Examiner*—Anthony Q. Edwards
(74) *Attorney, Agent, or Firm*—Rabin & Berdo, PC

(57) ABSTRACT

A flat panel display includes a base, a supporting arm, a slide-bracket and a display module. The supporting arm has a first end and a second end. The first end of the supporting arm is hinged to the base so that the supporting arm can rotate relative to the base. The slide-bracket has a first end and a second end. The first end of the slide-bracket is hinged to the second end of the supporting arm so that the slide-bracket can rotate relative to the supporting arm. The display module is connected to the second end of the slide-bracket. Therefore, the display module can move relative to the base along with the movement of the supporting arm, and the display module can slide relative to the slide-bracket.

20 Claims, 8 Drawing Sheets

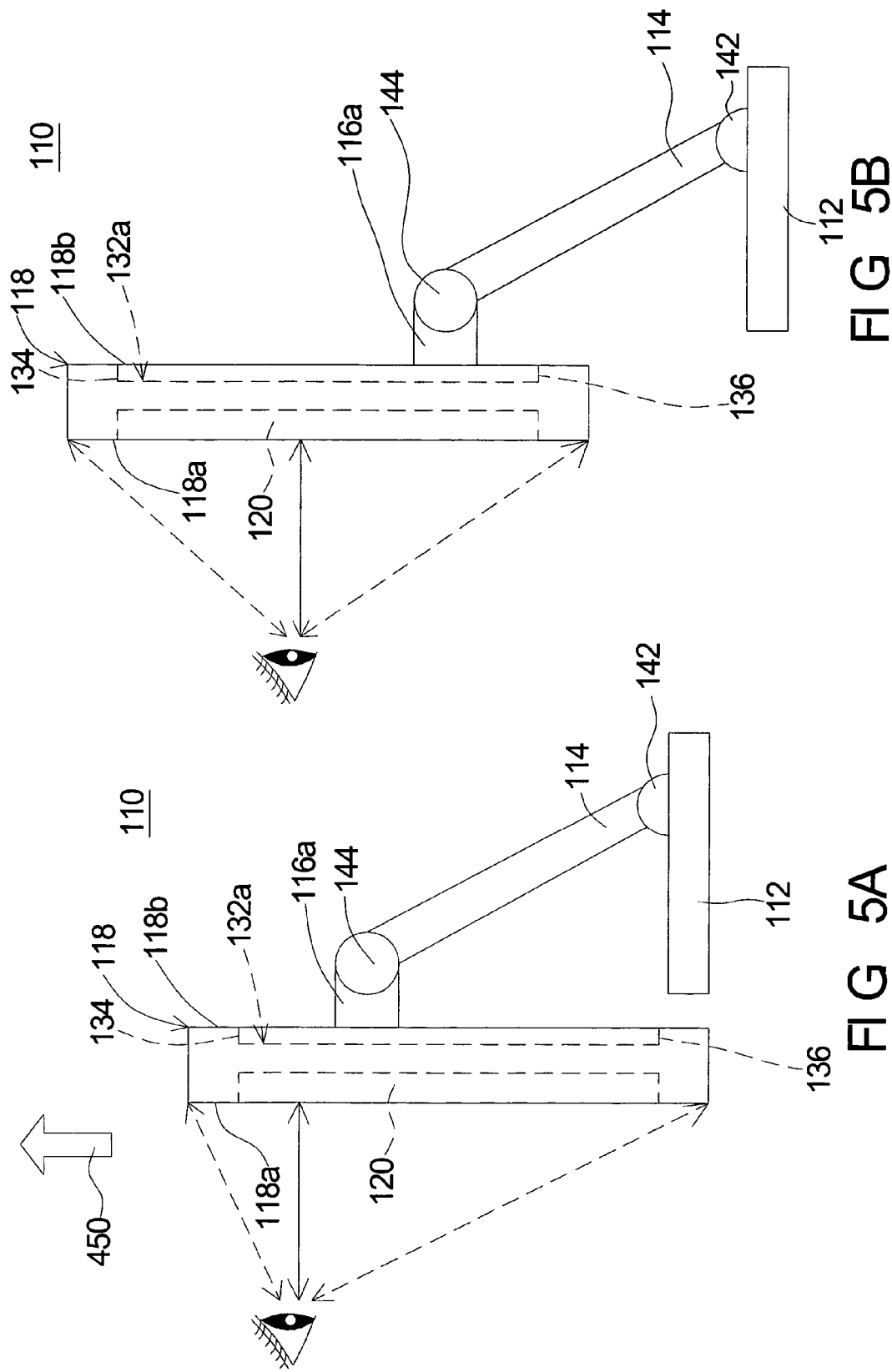

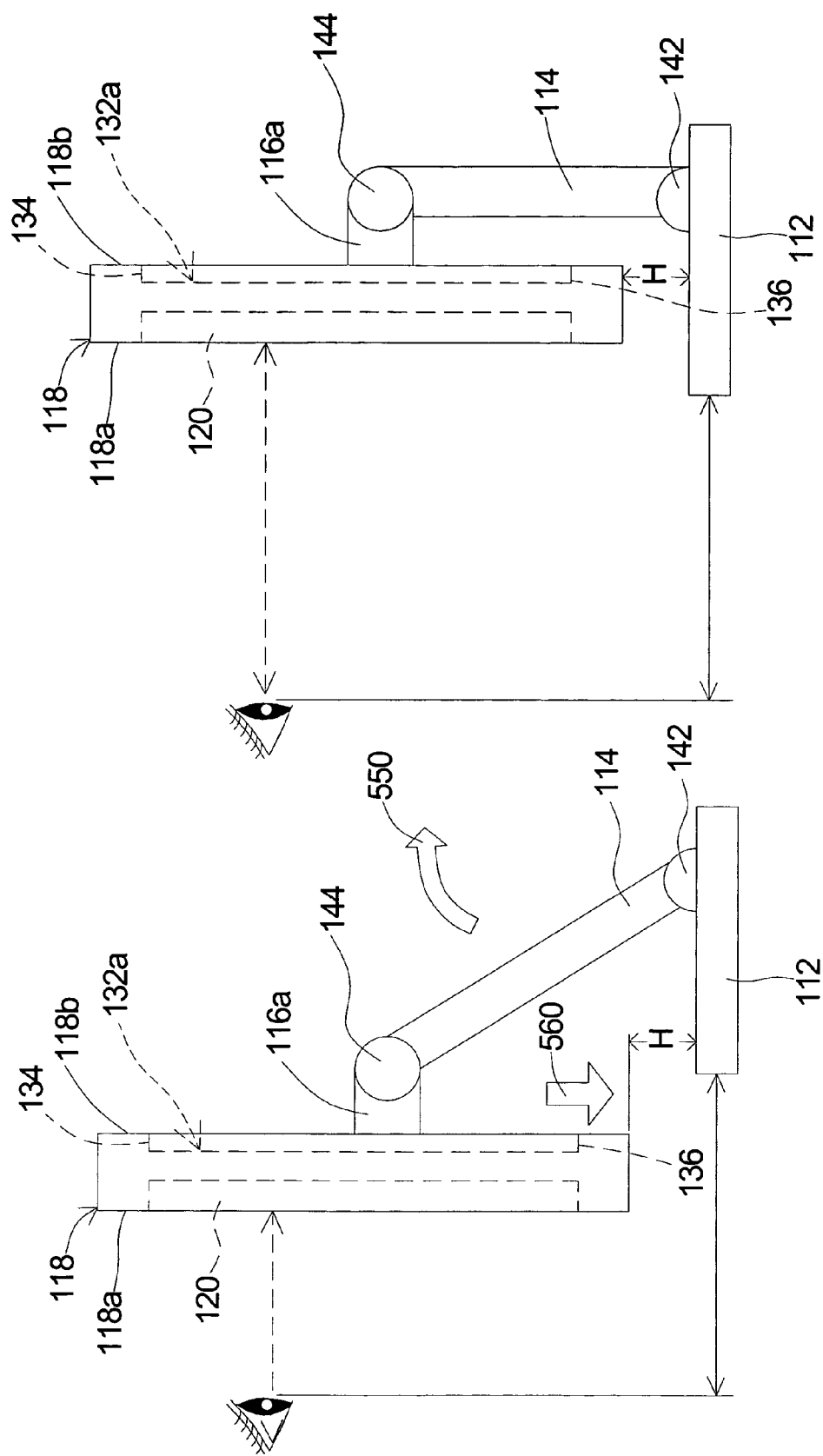

FLAT PANEL DISPLAY

This application claims the benefit of Taiwan application Serial No. 92121728, filed Aug. 7, 2003, the subject matter of which is incorporated herein by reference.

BACKGROUND OF THE INVENTION

1. Field of the Invention

The invention relates in general to a flat panel display, and more particularly to a flat panel display with a display module that can move upwards, downwards, forwards, and backwards relative to the base.

2. Description of the Related Art

Nowadays, desktop computers have become indispensable necessities for people in their day-to-day life. Generally speaking, a desktop computer includes at least a computer case with the components inside, and a computer screen that can be either a cathode ray tube (CRT) screen or a flat panel display. Because flat panel displays have the advantages of less weight, smaller size, no radiation, and smooth display over the CRT screens, they are popular computer screens.

Referring to FIG. 1A and FIG. 1B, the front view and the lateral view of a traditional flat panel display are shown. In FIG. 1A and FIG. 1B, the flat panel display 10 includes at least a base 12, a supporting arm 14, a swing bracket 16, and a display module 18. The display module 18 includes a front 18a, a back 18b, and a display panel 20. The display panel 20 is installed on the front 18a of the display module 18 and is used for displaying. The display panel can be for example a liquid crystal display (LCD) panel. The lower end of the supporting arm 14 is connected to one end of the base 12 at an angle, and the supporting arm 14 and the base 12 are usually made into one whole unit. The swing bracket 16 connects to the back 18b of the display module 18 by being installed on the top of the supporting arm 14 in a swing-able manner. The lower end of the swing bracket 16 is hinged to the top of the supporting arm 14 by a hinge 28 so that the display module 18 and the swing bracket 16 can swing simultaneously along the direction pointed out by the arrow 50. Thus, users can adjust the tilt angle of the display module 18 according to their preferences.

However, when the user wants to adjust the viewing distance by pushing further or pulling closer the display module, the user needs to move the entire flat panel display; it is a laborious task for the user. Furthermore, the traditional flat panel display can only swing forth and back, it cannot move vertically relative to the base 12. The user needs to adjust the viewing height and viewing angle in order to see the display from the flat panel display 20; it is very inconvenient from the user's point of view.

SUMMARY OF THE INVENTION

It is therefore an object of the invention to provide a flat panel display to let the user move the display module upwards, downwards, forwards, and backwards relative to the base. The invention allows the user to pull closer or push further the display module to adjust the viewing distance. The invention also allows the user to move the display module upwards and downwards to suitable height and angle for the user's sight. Compared with flat panel display in the art, the invention offers more convenience.

The invention achieves the above-identified object by providing a flat panel display that includes a base, a supporting arm, a slide-bracket, and a display module. The supporting arm has a first end and a second end. The first end of the supporting arm is hinged to the base so that the supporting arm can rotate relative to the base. The slide-bracket has a first end and a second end. The first end of the slide-bracket is hinged to the second end of the supporting arm so that the slide-bracket can rotatably connect to the supporting arm. The display module is connected to the second end of the slide-bracket. Therefore, the display module can move forwards and backwards relative to the base together with the movement of the supporting arm, and the display module can slide upwards and downwards relative to the slide-bracket.

The invention achieves the above-identified object by providing another flat panel display that comprises a base, a supporting arm, a slide-bracket, a load board, and a display module. The supporting arm comprises a first end and a second end. The first end of the supporting arm is hinged to the base for swinging relative to the base. The slide-bracket comprises a first and a second end. The first end of the slide-bracket is hinged to the second end of the supporting arm for swinging relative to the supporting arm. The load board comprises a front and a back. The back of the load board is connected to the second end of the slide-bracket so that the load board and the slide-bracket can swing synchronously. The display module is connected to the front of the load board. The display module can move forwards and backwards relative to the base by the swing of the supporting arm. The display module can slide upwards and downwards relative to the load board.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 5A is a lateral view of the display module with a certain height.

FIG. 5B is a lateral view of the display module with a different height from the display module of FIG. 5A.

FIG. 6A is a lateral view of the display module with a certain viewing distance.

FIG. 6B is a lateral view of the display module with a different viewing distance from the display module in FIG. 6A.

DETAILED DESCRIPTION OF THE INVENTION

EMBODIMENT 1

Figure 1A:
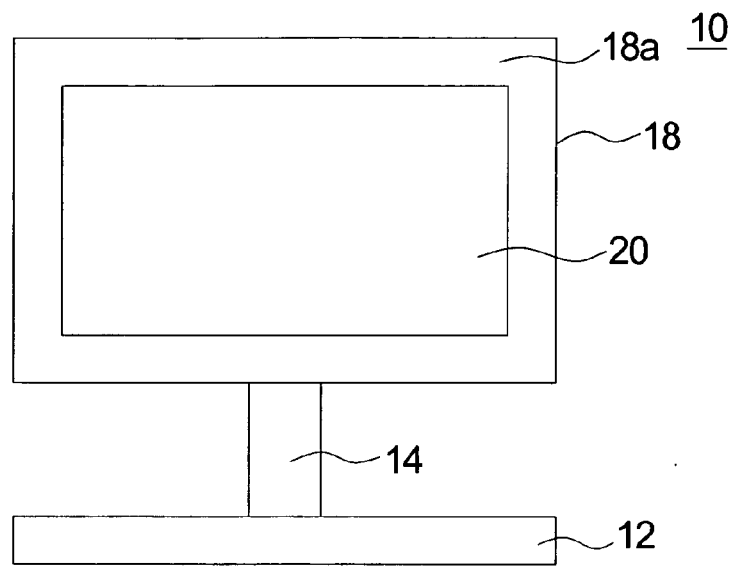
FIG. 1A is a front view of the traditional flat panel display.
Figure 1B:
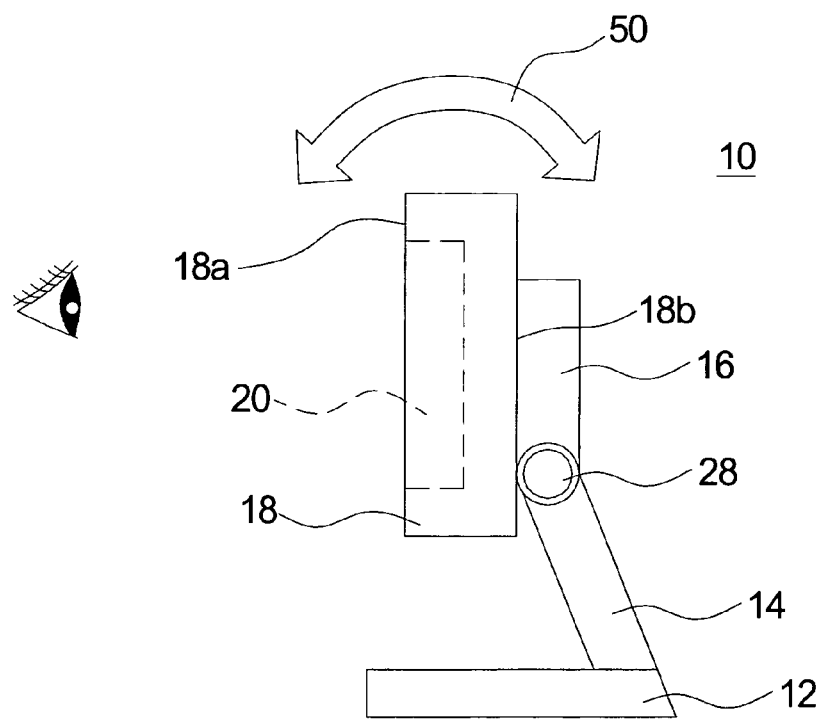
FIG. 1B is a lateral view of the traditional flat panel display.
Figure 2A:
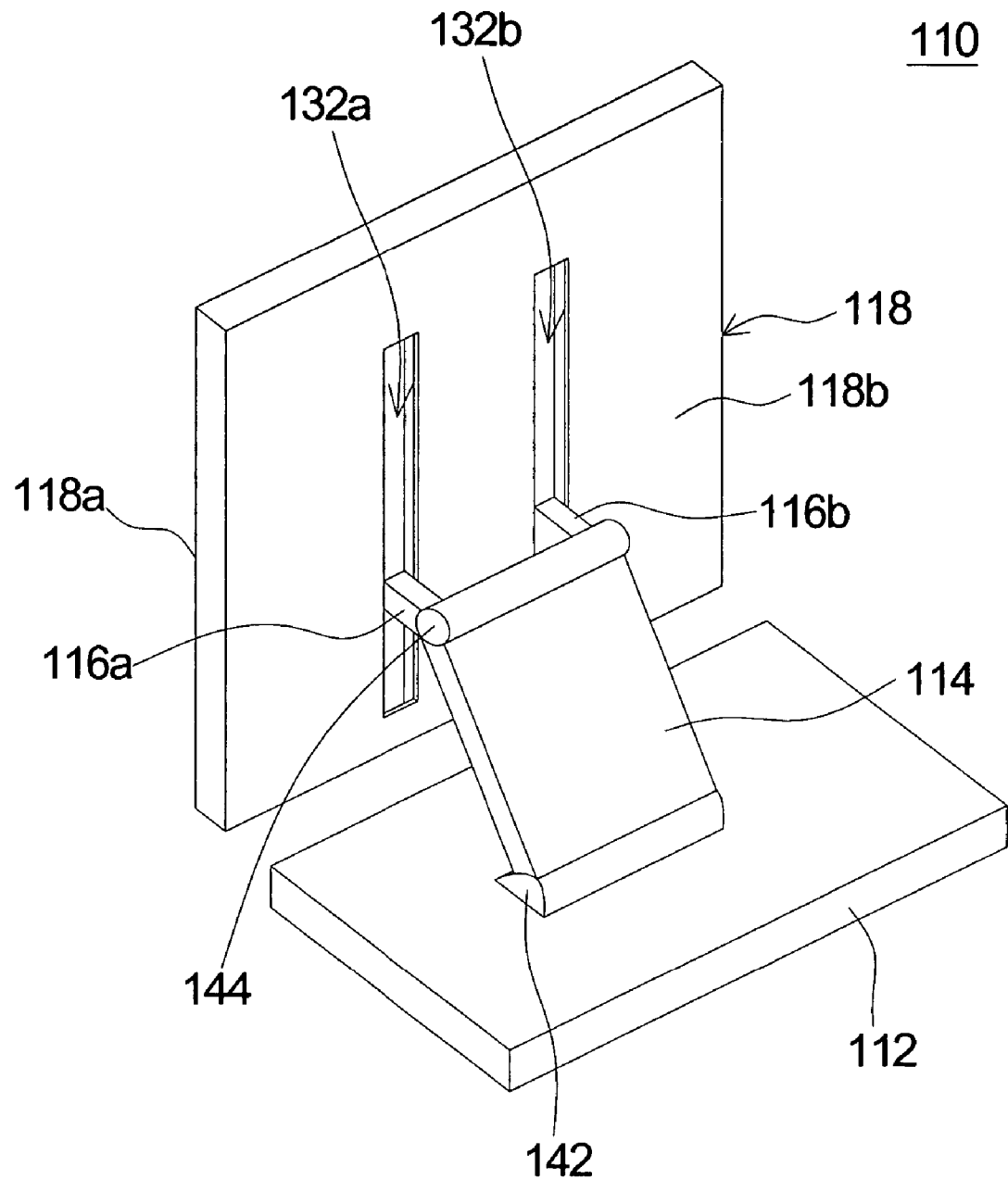
FIG. 2A is a 3-D diagram of the first embodiment according to the invention.
Figure 2B:
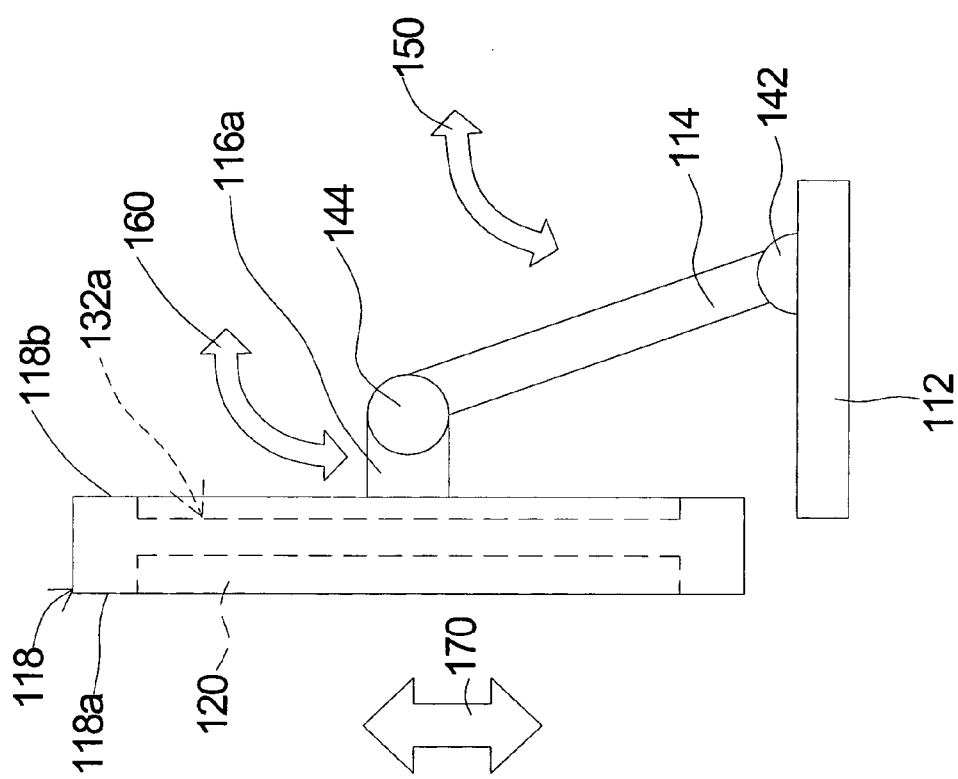
FIG. 2B is a lateral view of the first embodiment according to the invention.

Referring to FIG. 2A and FIG. 2B, the 3-D diagram and the lateral view of the first embodiment according to the invention are respectively shown. In FIG. 2A and FIG. 2B, the flat panel display 110 includes at least a base 112, a supporting arm 114, a display module 118, and two slide-brackets 116a and 116b. The display module 118 has a front 118a and a back 118b. In this embodiment, there are two slide-brackets 116a and 116b, but the numbers of slide-brackets are not limited to this embodiment as shown in FIG. 2A; it could be one or more than one, depending on different requirements. A display panel 120 could be installed on the front 118a of the display module 118 as shown in FIG. 2B, and it is used to display information. The supporting arm 114 has a first end and a second end. The first end of the supporting arm 114 is hinged to the base 112 in a way that the supporting arm 114 can rotate relative to the base 112, along the direction pointed out by the arrow 150 of FIG. 2B. In addition, a first hinge 142 is used to connect with the supporting arm 114 and the base 112 so that the supporting arm 114 rotate relative to the base 112 around the first hinge 142. When an external force exerted by the user is greater than the torque of the first hinge 142, the supporting arm 114 starts to rotate; when the external force is released, the first hinge 142 allows the supporting arm 114 to stay stable on the base 112 with a tilted angle.

Each of the slide-brackets 116a and 116b has a first end and a second end. The first ends of the slide-brackets 116a and 116b are axially hinged to the second end of the supporting arm 114 in a way that the slide-brackets 116a and 116b can rotate along the direction pointed out by the arrow 160 of FIG. 2B. A second hinge 144 connects with the supporting arm 114 and the slide-brackets 116a and 116b. The slide-brackets 116a and 116b can swing relative to the supporting arm 114 around the second hinge 144. When an external force exerted by the user is greater than the torque of the second hinge 144, the slide-brackets 116a and 116b starts to rotate; when the external force is released, the second hinge 144 allows the slide-brackets 116a and 116b to stay stable on the supporting arm 114; at this moment, the slide-bracket 116a and 116b and the supporting arm 114 forms an angle correspondingly.

The back 118b of the display module 118 is connected to both the second ends of the slide-brackets 116a and 116b. The display module 118 can move substantially backwards and forwards relative to the base 112 by the rotation of the supporting arm 114. The display module 118 can also slide substantially upwards and downwards relative to the slide-brackets 116a and 116b, along the direction pointed out by the arrow 170, as shown in FIG. 2B. Furthermore, the display module 118 can form a tilted angle relative to the base 112 by the movement of the slide-brackets 116a and 116b.

The grooves 132a and 132b are disposed on the back 118b of the display module 118. The grooves 132a and 132b connect to slide-brackets 116a and 116b respectively so that the display module 118 can slide substantially upwards and downwards relative to the slide-brackets 116a and 116b. The method that allows the sliding movement of the display module 118 by the slide-brackets and the grooves 132a and 132b will be explained in detail by two examples with figures; the examples are based on the slide-bracket 116a and the groove 132a.

Figure 3A:
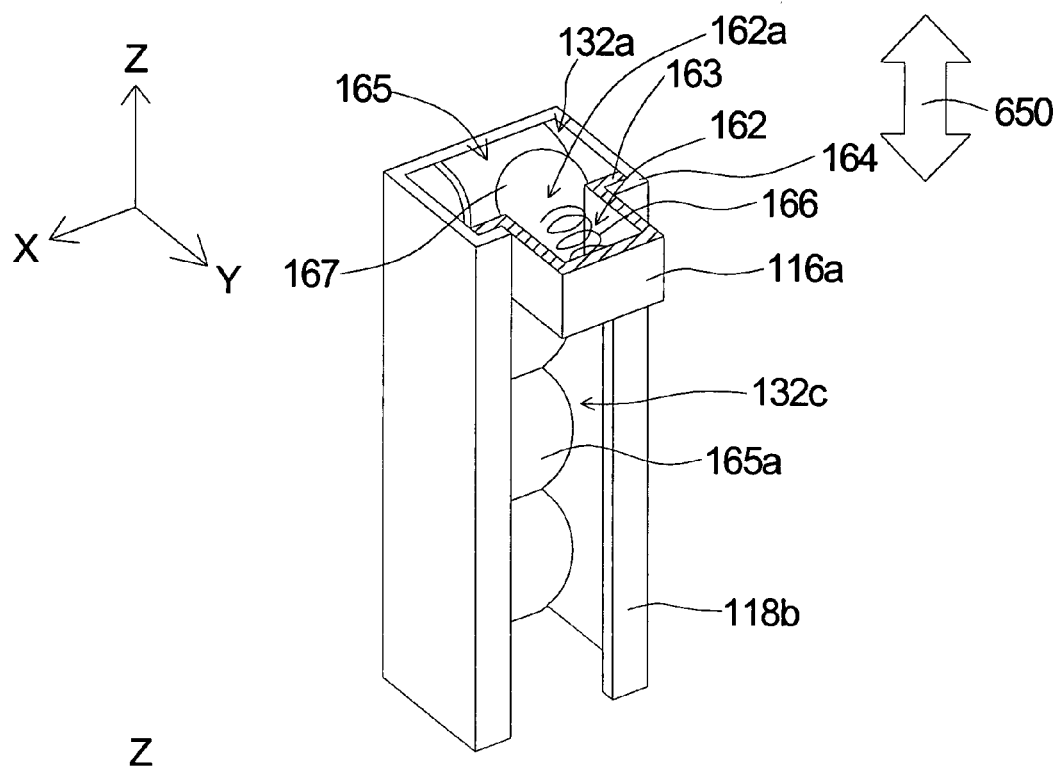
FIG. 3A is a partial diagram showing one of the connection method of the groove and the slide-bracket of the invention.
Figure 3B:
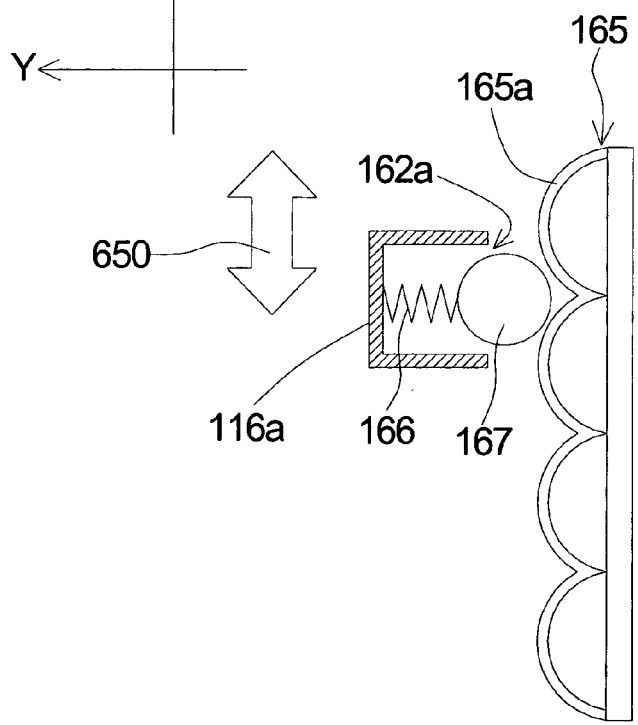
FIG. 3B is a cross-sectional view, which is viewed from the direction of x-axis, of FIG. 3A on the y-z plane.

Referring to FIG. 3A and FIG. 3B, FIG. 3A is a partial diagram showing connection between the slide-bracket and the groove, and FIG. 3B is a cross-sectional view of y-z plane in FIG. 3A, from the direction of x axis. In FIG. 3A, the slide-bracket 116a has a cavity 162, a spring 166, and a first protruding part 163. The cavity 162 is opposite to the groove 132a. The first protruding part 163 is disposed next to the first opening 162a of the cavity 162. A second protruding part 164 is disposed next to the second opening 132c of the groove 132a and is used to engage the first protruding part 163. In the present invention, the flat display panel further includes a spring sheet 165 inside the groove 132a, and a steel ball 167. The spring sheet 165 has a number of bulges 165a that are arranged into an array along the groove 132a. The steel ball 167 is placed between the spring sheet 165 and the spring 166 for stabilizing the display module 118 in one of the predetermined positions shown in FIG. 2B.

When an external force is exerted on the display module 118 of FIG. 2B and forces it to slide on the slide-bracket 116a, the steel ball 167 rolls on the spring sheet 165 as shown in FIG. 3B. The sliding direction of the display module 118 is shown as arrow 650 in FIG. 3A. When the external force is released and the steel ball falls in between two bulges 165a, the display module 118 of FIG. 2B is stabilized in one of the predetermined positions.

Figure 4A:
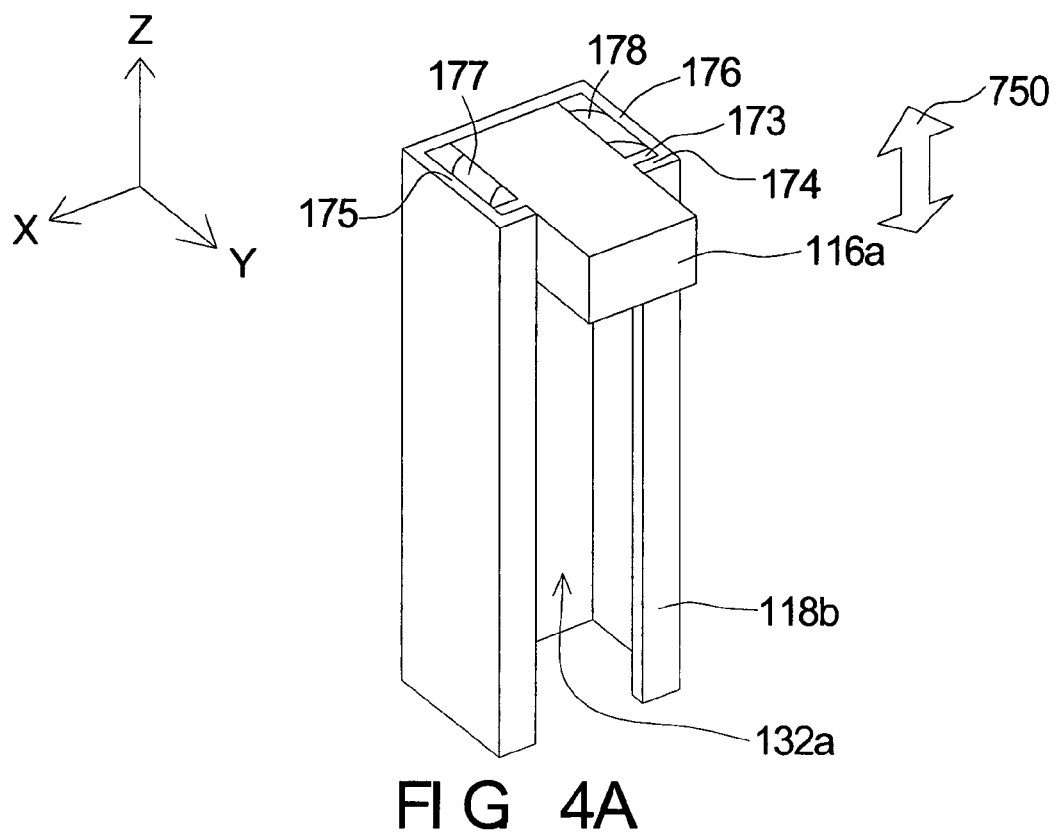
FIG. 4A is a partial diagram showing another connection method of the groove and the slide-bracket of the invention.
Figure 4B:
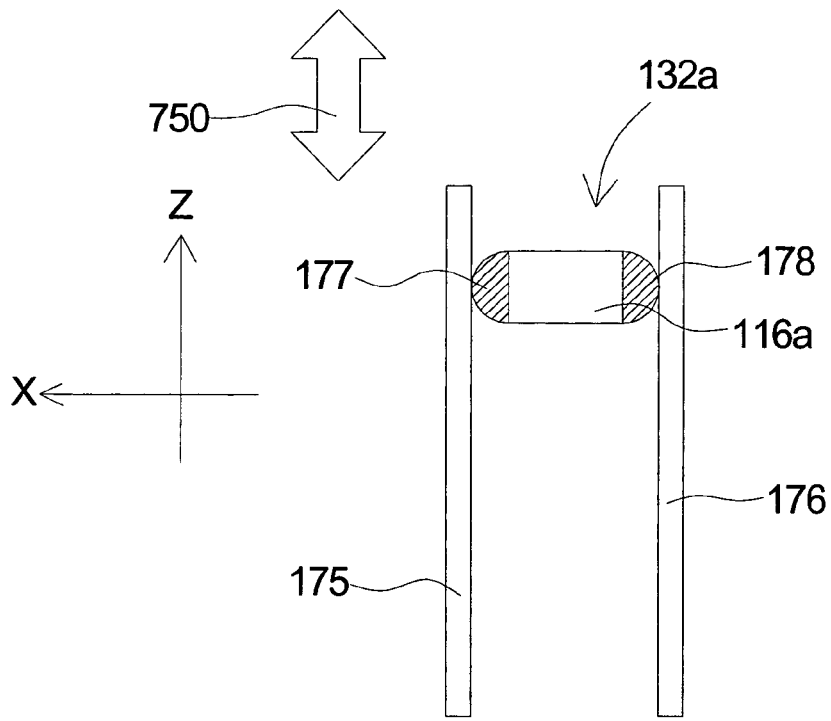
FIG. 4B is a cross-sectional view, which is viewed from the direction of y-axis, of FIG. 4A on the x-z plane.

Referring to FIG. 4A and FIG. 4B, FIG. 4A is a partial diagram showing another method of connecting the slide-bracket and the groove, and FIG. 4B is a cross-sectional view of x-z plane in FIG. 4A, from the direction of y-axis. In FIG. 4A and 4B, the slide-bracket 116a has a first protruding part 173, two resilient devices 177 and 178. The groove 132a has a second protruding part 174, and grooves 175 and 176. The second protruding part 174 is positioned against the first protruding part 173, and the resilient devices 177 and 178 press against the groove walls 175 and 176 respectively. When an external force is exerted on the display module 118 of FIG. 2B, the display module 118 is moving on the slide-bracket 116a, along the direction pointed out by the arrow 750 of FIG. 4B. The resilient devices 177 and 178 respectively slide on the groove walls 175 and 176 along the direction pointed out by the arrow 750 of FIG. 4B. When the external force is removed, the resilient devices 177 and 178 are against the groove walls 175 and 176 respectively to stabilize the display module 118 of FIG. 2B in a predetermined position.

When the display module 118 is too low, as shown in FIG. 5A, the user can adjust the height H (vertical distance) between the base and bottom of the display module by sliding the display module 118 along the direction pointed out by the arrow 450 of FIG. 5A; Meanwhile, the viewing distance (horizontal distance) between the user and the display module 118 is kept constant. By using the slide-brackets 116a and 116b and the grooves 132a and 132b, the user can adjust the height of display module 118 as shown in FIG. 5B. By doing so, the user can quickly adjust the display module 118 to the desired height and still keep the viewing distance constant; this is an advantage so that the user dose not needs to change her position or viewing angle.

When the display module 118 is too close to the user as shown in FIG. 6A, first of all, to adjust the viewing distance (horizontal distance from users' eyes to the display module), the user can push the supporting arm 114 to rotate along the direction pointed out by the arrow 550 of FIG. 6A. After the viewing distance is altered to a proper position, the user can force the display module 118 to slide downwards along the direction pointed out by the arrow 560 of FIG. 6A to restore the original height of the display module 118. In other words, by rotating the supporting arm 114, the slide bracket 116a and sliding the display module 118, the height H (vertical distance) of the display module is kept constant while the desired viewing distance is reached. Of course, users can adjust the viewing distance (horizontal distance) while keeps the height H (vertical distance) constant in a different process order i.e. sliding the display module 118 first and then rotate the supporting arm 114 and the slide bracket 116a or repeating these two steps until a proper height H is reached. This is an advantage so that the user does not need to move the entire flat panel display in order to reach a desired viewing distance.

Obviously, the above mechanism can be also applied while the display module 118 is desired to be rotated substantially closer to the user simply by sliding the display module 118 substantially upwards instead of downwards before or after the viewing distance is changed.

EMBODIMENT 2

Figure 7:
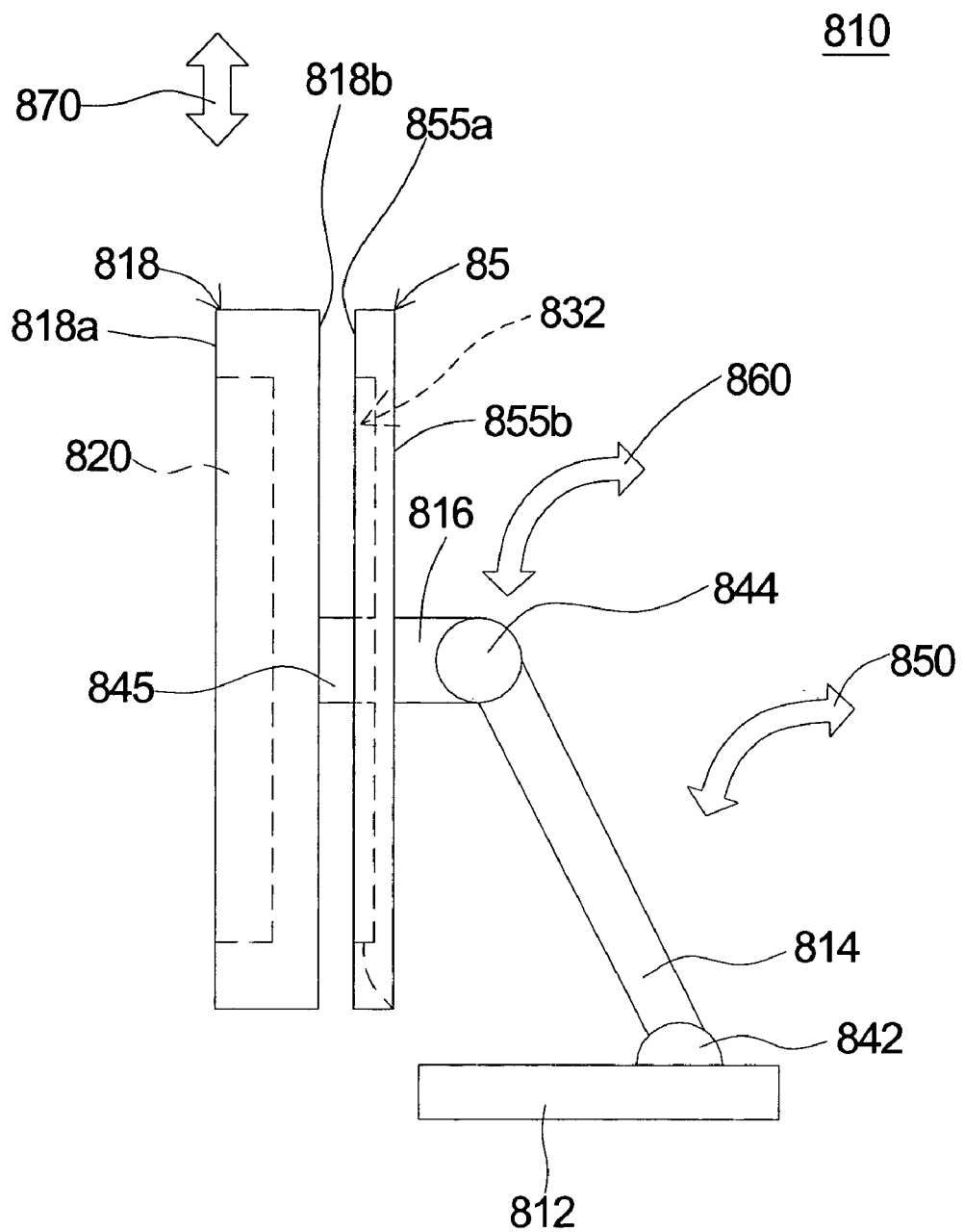
FIG. 7 is a lateral view of the flat panel display according to the second embodiment of the invention.

Referring to FIG. 7, a lateral view of the flat panel display according to a second embodiment of the invention is shown. In FIG. 7, the flat panel display has a base 812, a supporting arm 814, at least a slide-bracket 816, a load board 855 and a display module 818. The display module 818 has a front 818a and a back 818b. A display panel 820 is installed on the front 818a of the display module 818. The supporting arm 814 has a first end and a second end. The first end of the supporting arm 814 is connected to the base 812 by a hinge 842 so that the supporting arm 814 can rotate relative to the base 812, along the direction pointed out by the arrow 850 of FIG. 7.

The slide-bracket 816 has a first end and a second end. The first end of the slide-bracket 816 hinges to the second end of the supporting arm 814 by a second hinge 844 so that the slide-bracket 816 can rotate relative to the supporting arm 814, along the direction pointed out by the arrow 860 of FIG. 7. The load board 855 has a front 855a and a back 855b. The back 855b of the load board 855 is connected to the second end of the slide-bracket 816, so that they can swing synchronously. The display module 818 has a front 818a and a back 818b. The display panel 820 is installed on the front 818a, and the back 818b is connected to the front 855a of the load board 855. The display module 818 can move substantially forwards and backwards relative to the base 812 by the rotation of the supporting arm 814, and the display module 818 can slide upwards and downwards relative to the load-bearing board 855 along the direction pointed out by the arrow 870.

The flat panel display 810 also has a slider 845 and a groove 832. The slider 845 is installed on the back 818b of the display module 818, and the groove 832 is installed on the front 855a of the load board 855; the slider 845 and the groove 832 are disposed oppositely to each other. The connection between the slider 845 and the groove 832 is the same as the connection between the slide-bracket 116a and the groove 132a in the FIGS. 3A, 3B, 4A, and 4B, and is explained in the following.

For example, the groove 832 has a groove wall and the slider 845 has a resilient device that is against the groove wall. When an external force drives the display module 818 to slide on the load board 855, the resilient device can slide along the groove wall. When the external force is released, the resilient device is against the groove wall to stabilize the display module 818 in one of the predetermined positions. Furthermore, the slider 845 has a first protruding part, and the groove 832 has a second protrude part engaging with the first protruding part as shown in FIG. 4A.

In addition, the slider 845 includes also a cavity and a spring. The spring is installed inside the cavity. The flat panel display 810 also has a spring sheet and a steel ball; the spring sheet is installed in the groove, and the steel ball is placed in between the spring sheet and the spring of the slider 845 in order to stabilize the display module in one of the predetermined positions. The spring sheet has a number of bulges aligned along the groove 832. When an external force drives the display module 818 to slide on the load board 855, the steel ball rolls on the spring sheet. When the external force is released, the steel ball falls in between two bulges and thus the display module is stabilized in one of the predetermined positions. The cavity of the slider 845 has a first opening, the groove 832 has a second opening, and the flat panel display 810 also has a first protruding part and a second protruding part. The first protruding part is next to the first opening, and the second protruding part is next to the second opening; the second protruding part engages the first protruding part as shown in FIGS. 3A and 3B.

Similar to the first embodiment, the height (vertical distance) between bottom of the display module 818 and the base 812 is kept constant by rotating the supporting arm 814, the load board, the slide-bracket and sliding the display module relative to the load board 855. Furthermore, the display module 818 can form a tilt angle with the base 812 by the synchronized swing of the load board 855 and the slide-bracket 816.

The flat panel display of the invention allows the user to move the display module forwards, backwards, upwards, and downwards without moving the base. The invention makes it easier to pull closer or push further the display module in order to adjust the viewing distance, and it also allows the user to slide the display module upwards or downwards to adjust a desired sight and angle. Compared with flat panel displays in the art, which need to change the viewing distance traditionally, the invention is more convenient.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A flat panel display comprising:
   a base;
   a supporting arm with a first end and a second end, wherein the first end of the supporting arm is rotatably coupled to the base;
   a slide-bracket with a first end and a second end, wherein the first end of the slide-bracket is rotatably coupled to the second end of the supporting arm; and
   a display module comprising a groove disposed in a back of the display module, wherein the second end of the slide-bracket is slidable within the groove so that the display module slides substantially upwards and downwards relative to the slide-bracket,
   whereby the display module moves relative to the base by rotating the supporting arm and by sliding the display module relative to the slide-bracket.

2. The flat panel display according to claim 1, wherein the vertical distance between a bottom of the display module and the base is substantially constant by moving the supporting arm, the slide-bracket and the display module.

3. The flat panel display according to claim 1, wherein the display module forms an angle with the base by swing of the slide-bracket.

4. A flat panel display comprising:
a base;
a supporting arm with a first end and a second end, wherein the first end of the supporting arm is rotatably coupled to the base;
a slide-bracket with a first end and a second end, the slide-bracket comprising a cavity and a spring installed in the cavity, wherein the first end of the slide-bracket is rotatably coupled to the second end of the supporting arm;
a display module slideably coupled to the second end of the slide-bracket, whereby the display module moves relative to the base by rotating the supporting arm and by sliding the display module relative to the slide-bracket;
a groove disposed on the back of the display module and opposite to the cavity;
a spring sheet in the groove; and
a steel ball disposed between the spring sheet and the spring, for stabilizing the display module in a predetermined position.

5. The flat panel display according to claim 4, the spring sheet further comprising a plurality of bulges aligned along the groove, wherein when the display module is driven by an external force to slide on the slide bracket, the steel ball rolls on the spring sheet, when the external force is released and the steel ball rests between two adjacent bulges, the display module is stabilized in the predetermined position.

6. The flat panel display according to claim 5, wherein the cavity comprises a first opening, and the groove comprises a second opening, the flat panel display further comprising:
a first protruding part next to the first opening; and
a second protruding part, which is next to the second opening and engages with the first protruding part.

7. The flat panel display according to claim 4, wherein the vertical distance between a bottom of the display module and the base is substantially constant by moving the supporting arm, the slide-bracket and the display module.

8. The flat panel display according to claim 4, wherein the display module forms an angle with the base by swing of the slide-bracket.

9. A flat panel display comprising:
a base;
a supporting arm with a first end and a second end, wherein the first end of the supporting arm is rotatably coupled to the base;
a slide-bracket with a first end and a second end, wherein the first end of the slide-bracket is rotatably coupled to the second end of the supporting arm; and
a display module slideably coupled to the second end of the slide-bracket, whereby the display module moves relative to the base by rotating the supporting arm and by sliding the display module relative to the slide-bracket; the display module comprising a groove with a groove wall and the slide-bracket comprising a resilient device in contact with the groove wall, wherein when the display module is driven by an external force to slide on the slide-bracket, the resilient device slides on the groove wall and when the external force is released, the resilient device is against the groove to stabilize the display module in a predetermined position.

10. The flat panel display according to claim 9, wherein the slide-bracket comprises a first protruding part, and the groove comprises a second protruding part engaging with the first protruding part of the slide-bracket.

11. The flat panel display according to claim 9, wherein the vertical distance between a bottom of the display module and the base is substantially constant by moving the supporting arm, the slide-bracket and the display module.

12. The flat panel display according to claim 9, wherein the display module forms an angle with the base by swing of the slide-bracket.

13. A flat panel display comprising:
a base;
a supporting arm with a first end and a second end, wherein the first end of the supporting arm is rotatably coupled to the base;
a slide-bracket with a first end and a second end, wherein the first end of the slide-bracket is rotatably coupled to the second end of the supporting arm;
a load board with a front and a back, swinging synchronously with the slide-bracket the load board comprising a groove disposed in the front of the load board, wherein the back of the load board connects to the second end of the slide-bracket; and
a display module slideably coupled to the front of the load and
a slider disposed on a back of the display module and slidable within the groove so that the display module slides substantially upwards and downwards relative to the load board,
whereby the display module moves relative to the base by rotation of the supporting arm, and by sliding the display module relative to the load board.

14. The flat panel display according to claim 13, wherein the vertical distance between a bottom of the display module and the base is substantially constant by moving the supporting arm, the slide-bracket, the load board and the display module.

15. The flat panel display according to claim 13, wherein the display module forms an angle with the base by the synchronous swing of the slide-bracket and the load board.

16. The flat panel display according to claim 13, wherein the slider comprises a cavity and a spring installed in the cavity, the groove is opposite to the cavity of the slider, and the flat panel display further comprises:
a spring sheet in the groove; and
a steel ball disposed between the spring sheet and the spring, for stabilizing the display module in a predetermined position.

17. The flat panel display according to claim 16, the spring sheet further comprising a plurality of bulges aligned along the groove, wherein when the display module is driven by an external force to slide on the load board, the steel ball rolls on the spring sheet; when the external force is released and the steel ball rests between two adjacent bulges, the display module is stabilized in the predetermined position.

18. The flat panel display according to claim 17, wherein the cavity comprises a first opening, and the groove comprises a second opening, the flat panel display further comprising:
a first protruding part next to the first opening; and
a second protruding part, which is next to the second opening and engages with the first protruding part.

19. The flat panel display according to claim 13, the groove having a groove wall, and the a slider having a resilient device in contact with the groove wall, wherein when the display module is driven by en external force to slide on the slide-bracket, the resilient device slides on the groove wall; when the external force is released, the resilient device is against the groove to stabilize the display module in a predetermined position.

20. The flat panel display according to claim 19, wherein the slider comprises a first protruding part, and the groove comprises a second protruding part engaging with the first protruding part of the slider.

* * * * *